No. 878,494. PATENTED FEB. 11, 1908.
G. D. BASSE.
VINE TRELLIS.
APPLICATION FILED APR. 1, 1907.
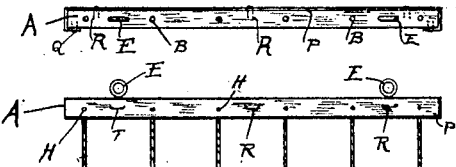
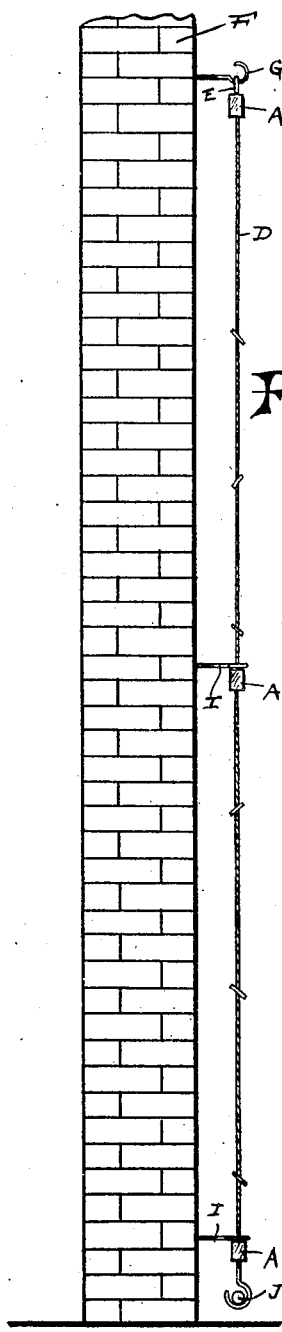
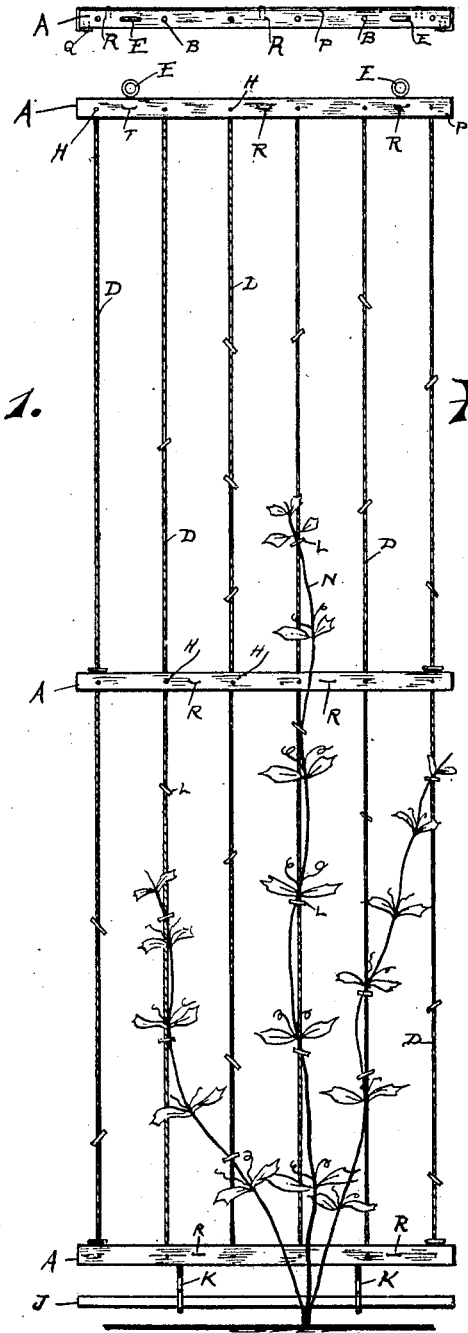
Fig. 1.   Fig. 2.   Fig. 5.
WITNESSES:   Fig. 3.   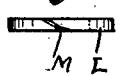   Fig. 4.   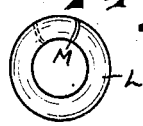   INVENTOR
Gerhard D. Basse
BY
ATTORNEYS.

UNITED STATES PATENT OFFICE.

GERHARD D. BASSE, OF MILWAUKEE, WISCONSIN.

VINE-TRELLIS.

No. 878,494.

Specification of Letters Patent.

Patented Feb. 11, 1908.

Application filed April 1, 1907. Serial No. 365,717.

*To all whom it may concern:*

Be it known that I, GERHARD D. BASSE, a citizen of the United States, residing at Milwaukee, county of Milwaukee, and State of Wisconsin, have invented new and useful Improvements in Vine-Trellises, of which the following is a specification.

My invention relates to improvements in that class of trellises for supporting vines for which Letters Patent # 824,227, was issued to me on the 26th day of June, 1906, the distinguishing features of which reside in the fact that the vine supporting cords or wires are first permanently secured to a plurality of transversely arranged bars preparatory to being supported from the sides of the walls of a building or other support.

My invention pertains more especially first to the construction of my trellis comprising the vertical members and the transversely arranged bars or members from which the vertical members are supported; second, to the elastic rings for yieldingly securing the vines at short intervals apart to the vertical members of the trellis; and third, to the means of removably suspending the trellis, when made, from the walls of a building or other support.

The construction of my invention is further explained by reference to the accompanying drawings in which, Figure 1 is a side view thereof suspended from the walls of a building. Fig. 2 is a front view of the trellis shown in Fig. 1. Fig. 3 is a side view, and Fig. 4 a top view of the vine supporting rings removed from the trellis, and Fig. 5 is a top view of one of the bars from which the vertical members of the trellis are supported.

Like parts are identified by the same reference letters throughout the several views.

My trellis comprises a plurality of horizontally arranged bars A from which a plurality of vertical members D are suspended. The upper bar A is provided at its upper side with a plurality of supporting eye screws E which are connected with a supporting wall F by a plurality of hooks G which engage in the apertures of the screws E. The horizontal bars are each provided with a plurality of vertical apertures B for the reception of the vertical members D in which apertures such vertical members are secured by a plurality of nails H or in any equivalent manner, whereby said bars are retained in place upon said vertical members.

To prevent the trellis from swinging when suspended from a wall as shown in Fig. 1, I preferably connect the same with such wall at intervals between the top and bottom by a plurality of horizontally arranged hooks I. It will be understood that the hooks G and I are first driven into the surface of the supporting wall when their outer ends are connected with the trellis as shown in Fig. 1.

When the trellis has been suspended from a wall as shown in Fig. 1, I suspend a transversely arranged weight J from its lower end by a plurality of hooks K, K, or in any equivalent manner which weight J has a tendency to keep the vertical members of the trellis taut and in their proper relative position to each other. While the weight J thus serves to keep the trellis in its proper position, it permits the same to expand and contract with heat or moisture without being torn or broken as it might otherwise be if rigidly connected at its lower end with the ground in the usual manner.

When the trellis has been completed and thus suspended from a wall as indicated in Figs. 1 and 2, the vines, which it is adapted to support, are trained to climb and remain supported upon the same by a plurality of elastic rings L, which rings are preferably made of rubber or other soft elastic material, the central aperture of which is but slightly larger than the vertical members of the trellis. The rings L are conveniently formed from soft rubber tubing by cutting such tubing transversely in short pieces when the aperture of the tubing forms the aperture of the ring. When the rings have been thus formed they are provided with diagonal slits M which permit of the rings being sprung apart and placed around and upon the vertical members D of the trellis. Thus it will be obvious that when desirous to secure a vine such as is indicated at N to the vertical members of the trellis, said elastic rings are opened and clamped around the trellis and the vine, whereby the vine will be yieldingly supported from such longitudinal member without liability of becoming broken or injured, while owing to the elasticity of the rings, they will yield as the vine expands with growth and they may be readily removed and readjusted as the growth of the vine requires. While the vertical members of the trellis may if desired be made of wire or other flexible material, they are preferably formed of ordinary twine which has previously been saturated with tar or other equivalent substance, which is adapted to protect the same from the injurious effects of the elements.

Attention is especially called to the fact that the horizontal bars A of the trellis are preferably formed of wood and are provided at their ends and front surfaces with metallic strengthening bands P, the ends of which bands are secured upon the rear side of the trellis by staples Q and extend from thence around the respective ends of the bars and are secured to the front surface of the bar by a plurality of staples or nails R. Thus it is obvious that the band P has a tendency to strengthen the bars and prevent the ends from becoming split, while it gives to the trellis a rich ornamental effect.

Having thus described my invention what I claim as new and desire to secure by Letters Patent is,

1. In a vine supporting trellis, the combination of a plurality of rigid horizontal bars each provided with a plurality of twine receiving apertures, a plurality of vertically arranged pieces of twine secured to said bars within said apertures, a plurality of elastic rings secured to said pieces of twine, a weight suspended from the lower bar of the trellis, and means for temporarily suspending the trellis from a supporting wall.

2. In a vine supporting trellis of the class described the combination of a plurality of horizontal wooden bars provided with a plurality of cord receiving apertures, a metallic band inclosing the respective ends and front surface of said bars, means for securing said bands to said bars, a plurality of flexible cords secured to said bars within said apertures, and means for securing said trellis to a supporting wall.

In testimony whereof I affix my signature in the presence of two witnesses.

GERHARD D. BASSE.

Witnesses:
   JAS. B. ERWIN,
   M. M. SCHULZ.